Aug. 27, 1940.  F. F. UEHLING  2,212,760
AUTOMATIC TEMPERATURE REGULATOR
Filed Jan. 23, 1939  2 Sheets-Sheet 1

FIG.1

INVENTOR
Fritz Frederick Uehling

Aug. 27, 1940.  F. F. UEHLING  2,212,760
AUTOMATIC TEMPERATURE REGULATOR
Filed Jan. 23, 1939  2 Sheets-Sheet 2

INVENTOR
Fritz Frederick Uehling

Patented Aug. 27, 1940

2,212,760

UNITED STATES PATENT OFFICE 2,212,760

AUTOMATIC TEMPERATURE REGULATOR

Fritz Frederick Uehling, Passaic, N. J.

Application January 23, 1939, Serial No. 252,438

12 Claims. (Cl. 236—69)

This invention relates to improvements in automatic temperature regulators of the class in which an electric circuit is either opened or closed, depending upon whether or not the regulated temperature is above or below the particular temperature which the regulating means is designed to maintain. In such devices, primary circuits are generally closed by a temperature responsive element, one of such circuits being closed by said element when it is deflected from its normal position against a fixed contact piece, and another of such circuits being closed by said element when deflected in the opposite direction against a second fixed contact piece. The electric sparking which occurs between a temperature responsive element and such contact pieces is very objectionable; furthermore when a circuit which is closed in this manner includes a relay, the relay will definitely chatter, particularly when the temperature responsive element is deflected only to a point where it barely touches the fixed contact piece. In some types of controllers oscillating depressor bars actuated by auxiliary power are used to definitely force the temperature responsive element against one or the other of such contact pieces when the responsive element is deflected away from its normal position. It is however the purpose of this invention to entirely eliminate sparking, to make definite and reliable contact without the use of depressor bars, and at the same time to entirely eliminate the possibility of chattering. More particularly it is the purpose of this invention to provide temperature responsive contact elements which control the temperature regulating circuit or circuits while the circuits which include said contact elements are opened or closed by auxiliary means actuated in a novel manner by a temperature responsive galvanometer. This is accomplished by means of a multiplicity of relays actuated by the combination of a multiplicity of temperature responsive elements, and the novel application of a resistance, all as described in detail by the following specifications:

Figure 1:
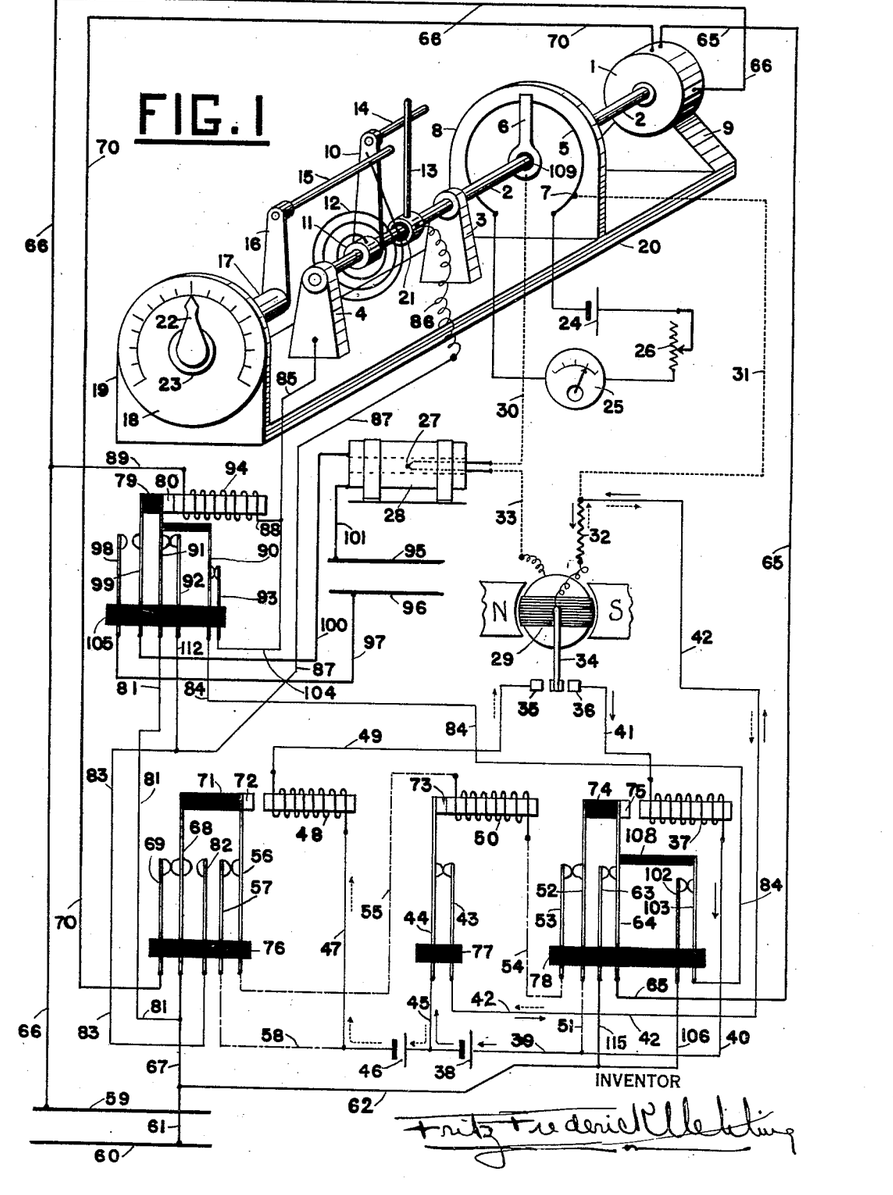
Figure 1 illustrates diagrammatically all of the elements of the invention, their relation to one another, and their interelectric connections.

In the particular application of the invention as herein described, the temperature sensitive element consists of a thermocouple 27, the electro-motive force of which is balanced by a potentiometer consisting of a slide-wire 5 and a motor actuated slide-wire brush 6, Figure 1. The brush is fastened to a shaft 2 which is mounted in bearings 3 and 4 and is capable of being rotated in one direction or the other by means of a reversible motor 1. The motor is carried by a support 9 while the slide-wire 5 is held in a plane at right angles to the axis of the shaft by means of an extension 8, said extension as well as the motor support 9 and the shaft bearings 3 and 4 forming part of a general supporting frame 20. The current through slide-wire 5 of the potentiometer is supplied by a battery 24, and is measured by means of a milliammeter 25. A rheostat 26 is provided for adjusting the current through the slide-wire to suit the required calibration. A galvanometer consisting of the usual coil 29, pivoted between the north and south poles of a permanent magnet, is included in the couple circuit. This circuit is shown by dotted lines to readily distinguish it from other electrical connections. It starts at the couple 27, thence through wire 30 to the slide-wire brush 6 which is insulated from the shaft 2 by means of an insulation bushing 109. From the brush 6 the couple circuit continues through the slide-wire 5 to the slide-wire connection 7, thence through wire 31 and a resistance 32 to the galvanometer coil 29, and from the galvanometer coil through wire 33 back to the couple. The resistance 32 which is not only included in the couple circuit but also in a multiplicity of additional circuits, constitutes a very important part of this invention as will be more apparent from the subsequent description.

Electrically connected with one end of the galvanometer coil 29 and permanently fastened to said coil is a contact arm 34, the motion of which is limited in one direction by a fixed contact piece 35 and in the opposite direction by a fixed contact piece 36. The galvanometer is so adjusted that when the coil 29 is in its normal or balanced position (no currrent flowing through the coil) the contact arm 34 will remain midway between the fixed contacts 35 and 36 as illustrated in Figure 1. The electro-motive force of the couple 27 has a polarity which tends to energize the coil 29 in the proper direction to move the contact arm 34 clockwise against the fixed contact piece 35, while the polarity of battery 24 is such that the electro-motive force between the potentiometer brush 6 and the point 7 opposes that of the couple and therefore tends to energize the coil 29 in the opposite direction to move the contact arm 34 counter-clockwise against the fixed contact piece 36. It therefore follows that if the electro-motive force of the couple 27 is greater than the electro-motive force between the brush 6 and the point 7 of the potentiometer, the contact arm 34 will rest against the fixed contact 35, and if the electro-motive force across the slide-wire 5 between the brush 6 and the point 7 is greater than the electro-motive force of the couple, the contact arm 34 will rest against the fixed contact 36. The couple 27 is located in an electric furnace 28, the electrical input of which is regulated by means of a novel combination of relays and contacts controlled by the current which flows through the galvanometer coil 29, the magnitude and direction of said current depending upon the opposing electro-motive forces of the aforesaid couple and potentiometer. The circuit which includes the furnace starts at the power line 95—96, thence through wire 97 to a relay actuated furnace control switch consisting of contact blades 98 and 99, from the furnace control switch through wire 100 to the furnace and thence back to the power line through wire 101.

Figure 2:
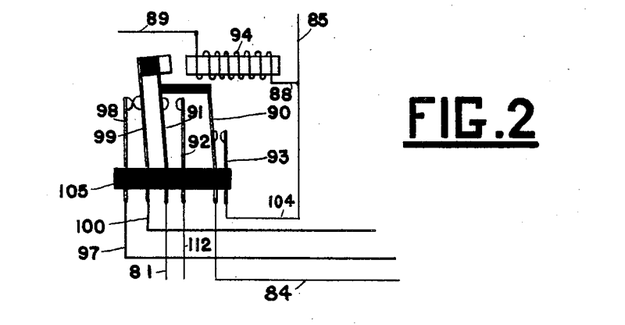
Figure 2 illustrates one of the relays in its deenergized position said relay being also shown in Figure 1 in its energized position.

The furnace control switch as well as two additional switches consisting respectively of contact blades 91 and 92, and contact blades 93 and 90 are actuated by relay 94. These blades which consist of a resilient material are supported and insulated from each other by means of an insulation block 105. The upper ends of contact blades 99, 91, and 90 are held together by means of insulation pieces as illustrated, while the relay armature 80 is fastened to the upper end of contact blade 91. Said contact blades are so designed and adjusted that when the relay 94 is energized, the armature 80 will be attracted to establish contact between the blades 91 and 92, and 90 and 93, and simultaneously to separate the contact blades 98 and 99, Figure 1, and that when said relay is deenergized, the tension of the contact blades 99, 91, and 90 will separate the contact blades 91 and 92, and 90 and 93, and simultaneously establish contact between the blades 98 and 99, as illustrated in Figure 2. The contact blades 98 and 99, 91 and 92, and 90 and 93 will hereinafter be referred to as switches 98—99, 91—92, and 90—93 respectively, said switches being open or closed in the manner stated depending upon whether the relay 94 is energized or deenergized. Three additional relays 48, 50 and 37 operate in conjunction with the relay 94 and two motor actuated contacts 13 and 14, to open and close the circuit through the furnace as required to maintain a desired temperature as determined by the position of a manually adjusted pointer 22. The manner in which these relays function with respect to each other and with respect to the temperature set point as determined by the position of the pointer 22 will be presently described.

Figure 3:
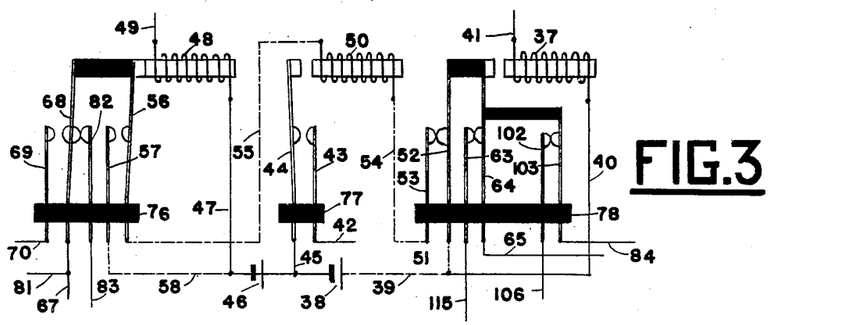
Figure 3 illustrates three additional relays, the relative positions of which are different than those shown in Figure 1.
Figure 4:
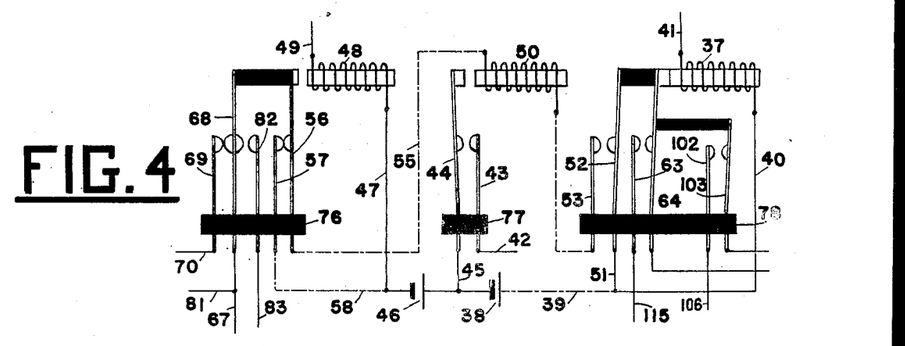
Figure 4 illustrates the same three relays, the relative positions of which are different than those shown in either Figure 1 or Figure 3.

Three switches actuated by the relay 48 consist respectively of contact blades 56 and 57, 82 and 68, and 68 and 69. These contact blades consisting of a resilient material are supported and insulated from each other by means of an insulation block 76. The upper ends of contact blades 56 and 68 are held together by means of an insulation piece 71 to which is also fastened the relay armature 72. Said contact blades are designed and adjusted so that when the relay 48 is energized, the armature 72 will be attracted to establish contact between the blades 68 and 82 and simultaneously to separate the contact blades 56 and 57, and the contact blades 68 and 69, Figure 3, and that when said relay is deenergized, the tension of the blades 56 and 68 will establish contact between blades 57 and 56 and between blades 68 and 69, and simultaneously separate the blade 68 from blade 82 as illustrated in Figures 1 and 4. The contact blades 68 and 69, 68 and 82, and 56 and 57 will hereinafter be referred to as switches 68—69, 68—82, and 56—57, said switches being open or closed in the manner stated depending upon whether the relay 48 is energized or deenergized. Similarly three switches are actuated by the relay 37, said switches consisting respectively of contact blades 52 and 53, 63 and 64, and 102 and 103. These blades also consist of a resilient material and are supported and insulated from each other by means of an insulation block 78. The upper ends of the contact blades 52, 64 and 103 are held together by means of insulation pieces 74 and 108 while the relay armature 75 is fastened to the upper end of contact blade 64 as illustrated. Said contact blades are designed and adjusted so that when relay 37 is energized, the armature 75 will be attracted to separate blades 52, 64 and 103 from blades 53, 63 and 102 respectively, Figure 4, and that when said relay is deenergized, the tension of contact blades 52, 64 and 103 will establish contact with blades 53, 63 and 102 respectively, Figures 1 and 3. The contact blades 52 and 53, 63 and 64, and 102 and 103 will hereinafter be referred to as switches 52—53, 63—64 and 102—103, said switches being open or closed depending upon whether relay 37 is energized or deenergized. Relay 50 actuates only one switch consisting of two resilient contact blades 43 and 44 which are supported and insulated from each other by means of an insulation block 77. The relay armature 73 is fastened to the upper end of the blade 44 and when the relay 50 is energized, is attracted to establish contact between the contact blades 43 and 44, Figure 1. When said relay is deenergized, the tension of the blade 44 will cause it to separate from the contact blade 43, Figures 3 and 4. The contact blades 43 and 44 will hereinafter be referred to as switch 43—44 which will be closed or open depending upon whether relay 50 is energized or deenergized.

An electric contact arm 13 is permanently fastened to the motor shaft 2, Figure 1, and is electrically insulated therefrom by means of an insulation bushing 21. A second contact member 14 with which the contact arm 13 is capable of making electric contact extends from an arm 10, as illustrated, said arm 10 being fastened to a hub 11 which hub is loosely mounted on the shaft 2 to permit motion of the contact member 14 independently of the motion of the shaft. The arm 10 including the contact member 14 is continuously urged in a clockwise direction by means of a spiral wire spring 12 one end of which is fastened to the hub 11 and the other end to a normally fixed element 15 which extends into the path of the arm 10 as illustrated. The spring 12 will thus force either the arm 10 against the normally fixed element 15, or the contact member 14 against the contact arm 13 depending upon the relative position of the contact arm 13 with respect to the normally fixed element 15. The normally fixed element 15 is fastened to an arm 16 which arm is fastened to one end of a rotatable shaft carried by a bearing 17. To the other end of said shaft is fastened a pointer 22, while between said pointer and a dial 18 is a friction washer 23 which holds the element 15 in its fixed position. It is obvious therefore that the fixed position of the element 15 may be adjusted by shifting the position of the pointer 22 with respect to the scale on the dial, said dial and bearing 17 being fastened to an extension 19 which forms part of the main frame 20. It is further obvious that the clockwise motion of the contact member 14 is limited by the position of the fixed element 15 by which the arm 10 is intercepted and against which said arm is held by the spiral spring 12 in the manner already stated. It thus follows that when the motor 1 rotates the shaft 2 in a counter-clockwise direction, the contact arm 13 which is fastened to said shaft will also move counter-clockwise and after it touches the contact member 14 it will carry said member and the arm 10 along with it away from the fixed element 15 against the tension of the spring 12. Similarly when the motor 1 rotates the shaft 2 in a clockwise direction, the contact member 14 will be held against the contact arm 13 by the tension of the spring 12 until the arm 10 is intercepted by the fixed element 15 after which the contact arm 13 will continue to move clockwise leaving the contact member 14 at rest in a position determined by the position of the fixed arm 15, said position depending upon the position of the pointer 22. The time during which the furnace 28 is energized and the time during which said furnace is deenergized is determined respectively by the time during which contact between 13 and 14 is broken, and the time during which contact between 13 and 14 is established. This is accomplished in combination with the aforesaid relays and galvanometer, one of the principal objects of the invention being to regulate the temperature of the furnace by means of said contacts 13 and 14 but without closing or opening the circuit which includes 14 and 15 at the time they are initially brought together or separated. This is accomplished, in a manner to be presently described, by said novel combination of the relays already referred to, and in conjunction with the resistance 32 and the galvanometer actuated contacts 34, 35 and 36.

The relay 50 is normally energized to close the switch 43—44 as illustrated in Figure 1. The circuit which includes this relay also includes the switch 56—57 of relay 48, the switch 52—53 of relay 37, and the batteries 38 and 46. This circuit which is identified by the dot and dash lines starts at the batteries 38 and 46, thence through wire 58 to switch 56—57 which is normally closed, from the switch through wire 55 to the relay 50, from said relay through wire 54 to switch 52—53 which is also normally closed, and thence through wires 51 and 39 back to the batteries. As previously stated the relay 37 is normally deenergized in which condition the switches 52—53, 63—64, and 102—103 are closed as illustrated in Figure 1. The circuit which includes the relay 37 also includes the battery 38, the switch 43—44 of relay 50, the resistance 32, the galvanometer contact arm 34 and the fixed contact 36. This circuit starts at the battery 38 from which the current flows, in the direction indicated by the full line arrows, through wire 45 to switch 43—44 of relay 50 which is normally closed, from switch 43—44 through wire 42 and resistance 32, in the direction indicated by the full line arrows, to the contact arm 34, and when said arm touches the fixed contact 36 the circuit continues through wire 41, relay 37 and wires 40 and 39 back to the battery 38. Similarly the circuit which includes the relay 48 also includes the battery 46, the switch 43—44 of relay 50, the resistance 32, the galvanometer contact arm 34, and the fixed contact 35. This circuit starts at the battery 46, from which the current flows, in the direction indicated by the dotted line arrows, through wire 47 to the relay 48, from said relay through wire 49 to the fixed contact 35, and when the galvanometer contact arm 34 touches the fixed contact 35, through the contact arm, resistance 32 and wire 42 in the direction indicated by the dotted arrows to switch 43—44 of relay 50, and thence through wire 45 back to the battery 46. It will be noted from the above that the circuit through relay 37 is closed by contact between the galvanometer contact arm 34 when it touches the fixed contact 36, and that the circuit through relay 48 is closed by contact between said contact arm and the fixed contact piece 35. Furthermore the resistance 32 is included in both these circuits and the current flow through said resistance, as illustrated by the dotted and full line arrows, is in one direction when the circuit through relay 37 is closed, and in the opposite direction when the circuit through relay 48 is closed. This condition is caused by the opposite polarities of batteries 38 and 46. Changing the direction of current flow through the resistance 32 constitutes a very important part of this invention and will be referred to again in connection with the coordination of all the circuits involved.

The circuit which energizes the motor 1 to rotate the shaft 2 and move the slide-wire brush 6 counter-clockwise is opened or closed by switch 63—64 of relay 37. This circuit starts at the power supply line 59—60, thence through wire 66 to the motor, from the motor through wire 65 to the switch 63—64 and thence through wires 115, 62 and 61 back to the power supply line. Similarly the circuit which energizes the motor 1 to rotate the shaft 2 and move the slide-wire brush 6 clockwise is opened or closed by switch 68—69 of relay 48. This circuit starts at the power supply line 59—60, thence through wire 66 to the motor, from the motor through wire 70 to the switch 68—69 and thence through wires 67 and 61 back to the power supply line. As previously stated, both relays 37 and 48 are normally deenergized under which condition both of the switches 63—64 and 68—69 will be closed and the motor 1 will be electrically opposed to make it inoperative. It therefore follows that when relay 37 is energized to open switch 63—64, the circuit through switch 68—69 of relay 48 will energize the motor to move the slide-wire brush 6 clockwise. Similarly when the relay 48 is energized to open switch 68—69, the circuit through switch 63—64 of relay 37 will energize the motor 1 to move the slide-wire brush 6 counter-clockwise. In other words, the shaft 2 including slide-wire brush 6 and contact arm 13 will move clockwise when relay 37 is energized, and counter-clockwise when relay 48 is energized.

Let us now assume that the electro-motive force of the couple 27 is balanced by the opposing electro-motive force of the potentiometer (drop across the slide-wire 5 between the brush 6 and the point 7). In such a case there will be no current flowing through the couple circuit (dotted lines) which includes the galvanometer coil 29, the contact arm 34 thus remaining in its normal position as illustrated. If now the temperature of the couple 27 increases slightly, the electro-motive force therefrom will increase in proportion, thereby disturbing the balance between the couple and the potentiometer with a resulting electro-motive force and polarity to energize the galvanometer coil in the proper direction to deflect the contact arm 34 against the fixed contact piece 35. It is however a well-known fact that the power of a thermo-couple actuated galvanometer is so small that when the contact arm 34 is only sufficiently deflected to just touch the contact piece 35, the pressure between the contact arm and the contact piece will be so small, and the resulting contact resistance so high, that not sufficient current will flow through the circuit which includes the relay 48 to actuate said relay. Regardless, however, of how delicately the contact arm 34 may be touching the fixed contact piece 35, some current will flow through this circuit in the direction indicated by the dotted line arrows, said direction as previously stated being determined by the polarity of the battery 46. Obviously no matter how infinitesimal may be the magnitude of said current, there will be a proportional drop in potential across the resistance 32. This drop will cause some of the current from the battery 46 to flow through the galvanometer circuit (dotted lines), said battery being of the proper polarity to cause said additional current flow through the galvanometer coil 29 in the proper direction to force the contact arm slightly tighter against the fixed contact 35. Any increase in pressure between 34 and 35 will however decrease the contact resistance thereby causing a proportional increase in the current flow through the relay 48 and the resistance 32 which in turn will also increase the drop across the resistance 32 to cause more current, from the battery 46, to flow through the galvanometer circuit to again increase the pressure between 34 and 35. The increased contact pressure will obviously still further increase the flow through the relay with a proportional increase in the drop across the resistance 32 to again increase the flow through the galvanometer and thus establish a still greater pressure between the contact arm 34 and the contact piece 35. This process will continue almost instantaneously until sufficient current flows through the relay 48 to actuate the armature 72 to the position illustrated in Figure 3. In this position the switch 56—57 will open to deenergize the relay 50 thus opening the switch 43—44 of said relay as illustrated. The opening of switch 43—44 will however open the circuit through the relay 48 thus again permitting the switch 56—57 to close. The closing of switch 56—57 will again energize the relay 50 to again close the switch 43—44 which switch as previously stated is in series with 34, 35 and the relay 48. Therefore, if the contact arm 34 still touches the contact piece 35, this cycle will repeat itself. In other words, so long as 34 touches 35 (no matter how delicately), relays 48 and 50 will be alternately energized and deenergized. Furthermore there will be no sparking between 34 and 35 because when the contact arm 34 touches 35 the pressure which said arm exerts on the contact 35 will, due to the drop across the resistance 32, immediately increase and continue to increase until sufficient current flows to energize the relay 48 after which, in the manner stated, the circuit which was initially closed by the contact arm 34 will be opened by the switch 43—44 of relay 50. As previously stated, however, the switch 68—69 will also be opened by the relay 48, when said relay is energized, to permit the motor 1 to operate in a counter-clockwise direction. The energizing of relay 48 will therefore also cause the motor 1 to move the slide-wire brush 6 in a counter-clockwise direction thereby increasing the electro-motive force across the slide-wire 5 between said brush and the point 7, said electro-motive force as already stated opposing the electro-motive force of the couple. It therefore follows that when the electro-motive force of the couple is greater than the opposing electro-motive force of the motor actuated potentiometer, the galvanometer coil 29 will be energized to deflect the contact arm 34 against the contact piece 35. Under this condition and in the manner stated, the relays 48 and 50 will be alternately energized and deenergized, thereby causing the motor 1 to move the slide-wire brush 6 counter-clockwise until the electro-motive force of the potentiometer has been sufficiently increased to again balance the electro-motive force of the couple. When the balanced condition has been established, the contact arm 34 and the relays 48 and 50 will again assume the positions illustrated in Figure 1, in which positions of said relays, the motor and brush 6 will remain at rest.

Similarly if the temperature of the couple 27 decreases slightly, the electro-motive force therefrom will decrease in proportion, thereby disturbing the balance between the couple and the potentiometer with a resulting electro-motive force and polarity to energize the galvanometer coil in the opposite direction to deflect the contact arm 34 against the fixed contact piece 36. In the manner previously stated, however, the pressure with which the contact arm 34 touches the contact piece 36, when deflected only sufficiently to just touch said contact, is so minute and the resulting contact resistance so high that not sufficient current will flow through the circuit which includes the relay 37 to actuate said relay. Regardless, however, of how delicately the contact arm 34 may be touching the fixed contact piece 36, some current will flow through said circuit in the direction indicated by the full line arrows, said direction as previously stated being determined by the polarity of the battery 38. No matter how infinitesimal may be the magnitude of said current, there will be a proportional drop in potential across the resistance 32. This drop will cause some of the current from the battery 38 to flow through the galvanometer circuit (dotted line), said battery having a polarity opposite to that of battery 46 thus causing said additional current to flow through the galvanometer coil 29 in the proper direction to force the contact arm 34 slightly tighter against the fixed contact 36. Any increase in the pressure between 34 and 36 will obviously decrease the contact resistance thereby causing a proportional increase in the current flow through the relay 37 and resistance 32 which in turn will also increase the drop across the resistance 32 to cause more current, from battery 38, to flow through the galvanometer circuit to again increase the pressure between 34 and 36. The increased contact pressure will obviously still further increase the flow through the relay circuit with a proportional increase in the drop across the resistance 32 to again increase the flow through the galvanometer coil 29 and thus establish a still greater pressure between the contact arm 34 and the contact piece 36. This process continues almost instantaneously until sufficient current flows through the relay 37 to actuate the armature 75 to the position illustrated in Figure 4. In this position the switch 52—53 will open to deenergize the relay 50 thus also opening the switch 43—44 of said relay as illustrated. The opening of switch 43—44 will however open the circuit through the relay 37 thus again permitting the switch 52—53 to close. The closing of switch 52—53 will again energize relay 50 to again close the switch 43—44 which switch as stated is in series with the contact arm 34, the contact piece 36 and the relay 37. Therefore if the contact arm 34 still touches the contact piece 36, this cycle will repeat itself. In other words, so long as 34 touches 36 (no matter how delicately), relays 37 and 50 will be alternately energized and deenergized. Furthermore there will be no sparking between 34 and 36 because when the contact arm 34 touches 36 the pressure which said arm exerts on the contact 36 will immediately increase and continue to increase until sufficient current flows to energize the relay 37 after which, in the manner stated, the circuit which was initially closed by the contact arm 34 will be opened by the switch 43—44 of relay 50. As previously stated, however, the switch 63—64 will also be opened by the relay 37 when said relay is energized to cause the motor 1 to operate in a clockwise direction. The energizing of relay 37 will therefore also cause the motor 1 to move the slide-wire brush 6 in a clockwise direction thereby decreasing the electro-motive force across the slide-wire 5 between said brush and the point 7 which electro-motive force as previously stated opposes the electro-motive force of the couple. It therefore follows that when the electro-motive force of the couple is exceeded by the electro-motive force of the motor actuated potentiometer, the galvanometer coil 29 will be energized to deflect the contact arm 34 against the contact piece 36. Under this condition and in the manner stated, the relays 48 and 50 will be alternately energized and deenergized thereby causing the motor 1 to move the slide-wire brush 6 clockwise until the electro-motive force of the potentiometer has been sufficiently decreased to again balance the electro-motive force of the couple. When the balanced condition has been established, the contact arm 34 and the relays 37 and 50 will again assume the positions illustrated in Figure 1, in which positions said relays, the motor and the slide-wire brush 6 will remain at rest.

It thus follows that when the temperature of the furnace 28 increases to a point where the electro-motive force of the couple 27 exceeds the opposing electro-motive force of the motor actuated potentiometer, the galvanometer will deflect the contact arm 34 against 35 to alternately energize and deenergize the relays 48 and 50 in the manner stated, thus causing the motor 1 to move the slide-wire brush 6 counter-clockwise until the electro-motive force of the potentiometer balances the electro-motive force of the couple at which time there will be no current flowing through the galvanometer coil 29, the contact arm 34 will again assume its normal position as illustrated in Figure 1, the relays 48 and 50 will cease to function and the switches thereof will again assume their normal positions as illustrated in said figure. Similarly when the temperature of the furnace decreases to a point where the electro-motive force of the potentiometer exceeds the electro-motive force of the couple, the galvanometer will deflect the contact arm 34 against 36 to alternately energize and deenergize the relays 37 and 50 in the manner stated, thus causing the motor 1 to move the slide-wire brush 6 clockwise until the electro-motive force of the couple is again balanced by the opposing electro-motive force of the potentiometer at which time there will be no current flowing through the galvanometer coil 29, the contact arm 34 will again assume its normal position as illustrated in Figure 1, the relays 37 and 50 will cease to function, and the switches of said relays will again assume their normal positions as illustrated in said figure. It is obvious therefore that as the temperature of the furnace 28 increases, the potentiometer brush 6, the shaft 2 and the contact arm 13 will turn in a counter-clockwise direction, and as the temperature of the furnace decreases, said brush, shaft and contact arm 13 will turn in a clockwise direction, the angular position of the brush 6 and the contact arm 13 changing in a counter-clockwise or clockwise direction in proportion to any increase or decrease in said temperature.

The manner in which the relays 37, 48 and 50 function in conjunction with the galvanometer, the resistance 32, the potentiometer 5 and the reversible motor 1 as above described is fully covered by applicant's Patent No. 2,022,097 issued November 26, 1935. It is however the operation of these relays with additional switches in combination with a third relay 94, and the control contact mechanism as actuated by the motor 1 which constitutes the novel features of the regulating device as covered by this invention.

As previously stated, contact between the contact arm 13 and the contact member 14 is made or broken at a point depending upon the position of the pointer 22 which pointer as already described forms an integral part of the arm 16 and the normally fixed extension 15 and may be manually adjusted to any position with respect to the calibrated dial 18, the position of the pointer determining the temperature at which it is desired to maintain the furnace 28. As previously stated, one of the important purposes of this invention is to avoid sparking between the contact arm 13 and the contact member 14 and to eliminate the possibility of chattering of any relay or other electrical device that may be controlled by contact between said arm and contact member. This is accomplished by including the relay 94, which is controlled by said arm and contact member, in three independent circuits all of which circuits are controlled by the combined action of the aforesaid relays. The first of said circuits includes the relay 94 and the switch 68—82 of relay 48, said switch 68—82 being normally open. This circuit starts at the power supply line 59—60, thence through wires 61 and 67 to the switch 68—82 of relay 48 and, when said relay is energized, through said switch, wires 83, 87 and flexible connection 86 to the contact arm 13. When the contact arm touches the contact member 14, the circuit continues through said member and the motor driven shaft to bearing 4, from bearing 4 through wires 85 and 88 to the relay 94, and thence through wires 89 and 66 back to the power supply line 59—60. The closing of this circuit will obviously energize relay 94. It will be noted, however, that the establishment of contact between the contact arm 13 and the contact member 14 will not close the circuit unless the relay 48 is energized because the switch 68—82 which is actuated by said relay is in series with the contact arm 13 and the contact member 14. It follows therefore that when the relays 48 and 50 are alternately energized and deenergized due to a rise in temperature in the manner previously stated, the contact arm 13 will be moved counter-clockwise by the motor 1 as already described, and the first electrical impulse through relay 48, after the initial contact between 13 and 14 has been established, will then close said first circuit to momentarily energize the relay 94. The switch 91—92 of relay 94 will however close during the instant in which said relay is thus energized. The closing of switch 91—92 will close a second or holding circuit through relay 94. Said second circuit which also includes the contact arm 13 and the contact member 14 starts at the power supply line 59—60, thence through wires 61, 67 and 81 to the switch 91—92, from the switch through wires 112, 87, and flexible connection 86 to the contact arm 13, from the contact arm through contact member 14 and the shaft to bearing 4, from the bearing through wires 85 and 88 to the relay 94 and thence through 89 and 66 back to the power supply line 59—60. Switch 90—93 of relay 94 will however also be closed when said relay is energized. This switch closes a third circuit through the relay 94 said third circuit including switch 102—103 of relay 37 said switch 102—103 being normally closed. The last mentioned circuit starts at the power supply line 59—60, thence through wires 61, 62 and 106 to switch 102—103, from the switch through wire 84 to the switch 90—93 of relay 94, from the switch through wires 104 and 88 to the relay coil 94 and thence through wires 89 and 66 back to the power supply line 59—60. As previously stated, relay 94 is included in both the second and third circuits. It will be noted however that the second circuit includes the contact arm 13 and contact member 14, while the third circuit includes switch 102—103 of relay 37. It follows therefore that the relay 37 may be energized to open switch 102—103 without deenergizing relay 94 so long as contact remains established between the contact arm 13 and the contact member 14, and similarly contact between 13 and 14 may be broken without deenergizing relay 94 so long as relay 37 is deenergized. If the thermo-couple be now subjected to a decreasing temperature, the relays 50 and 37 will be alternately energized and deenergized in the manner previously stated, thus causing the motor 1 to move the contact arm 13 in a clockwise direction. While the contact arm 13 is moving in said direction, the contact member 14 will be held against said arm, as already described, by the spring 12 until the arm 10 is intercepted by the normally fixed extension 15 after which, as the contact arm 13 continues in a clockwise direction, contact between it and 14 will be broken. It therefore follows that while the relays 37 and 50 are alternately energized and deenergized due to a falling temperature, the switch 102—103 will be consecutively opened and closed, thereby alternately opening and closing the third circuit through the relay 94. Said relay will however remain energized through the second circuit so long as contact is still established between 13 and 14. However, as soon as the contact arm 13 continues beyond the position determined by the normally fixed extension 15, contact between 13 and 14 will be broken after which the first opening of switch 102—103 will open the third circuit to deenergize the relay 94. It is obvious therefore that, although the period during which the relay 94 is energized or deenergized is controlled by the contact arm 13 and the contact member 14, there is no circuit either closed or open at the instant said contact arm and contact member are brought together or separated. In other words the circuit which initially energized the relay 94 is closed by the switch 68—82 of relay 48 during the first electrical impulse through said relay after contact has been established between 13 and 14. Similarly, the relay 94 is deenergized by the opening of switch 102—103 of relay 37 during the first electrical impulse through said relay after contact arm 13 has been separated from the contact member 14. The position in which the contact arm 13 and the contact member 14 is either made or broken depends on the position of the extension arm 15 which position may be changed, in the manner previously stated, by turning the pointer 22 in one direction or the other. For example if the pointer 22 is turned counter-clockwise to a new position, the extension arm 15 will force the contact member 14 away from the contact arm 13 against the tension of the spring 12. The new position of the extension arm 15 will thus determine a point corresponding to a higher temperature at which contact between 13 and 14 is made or broken. Similarly if the pointer 22 is turned clockwise to a new position, the extension arm 15 will also move clockwise away from the arm 10 which arm is prevented from following the extension arm 15 due to the fact that the contact member is intercepted by the contact arm 13. The new position of the extension arm 15 will thus determine a point corresponding to a lower temperature at which contact between 13 and 14 is made or broken.

To review the complete operation of the device described, let us assume that the temperature of the furnace 28 is below that for which the pointer 22 is set. Under this condition the contact arm 13 will be separated from the contact member 14 which member will remain in the position determined by the pointer 22 due to the interception of the arm 10 by the extension arm 15. With 13 and 14 thus separated, the relay 94 will be deenergized as illustrated in Figure 2 thus closing switch 98—99 which switch as previously stated closed the heating circuit through the furnace to increase the temperature of the couple 27. As the temperature rises the needle 34 of the galvanometer will deflect clockwise against the contact 35 thus, in the manner previously stated, causing the relays 48 and 50 to alternately energize and deenergize thereby causing the motor 1 to simultaneously move the potentiometer brush 6 and contact arm 13 in a counter-clockwise direction in proportion to the increasing temperature of the furnace. The counter-clockwise motion of the contact arm 13 will obviously continue with the rising temperature until it is intercepted by the contact member 14 after which, in the manner previously described the first electrical impulse through relay 48 will close the switch 68—82 to initially energize the relay 94 which relay due to the holding circuit through switch 91—92 will remain energized so long as the temperature is above that for which the pointer 22 is set. The energizing relay 94 will however open the furnace switch 98—99 thereby permitting the furnace 28 to cool. During the cooling period of the furnace, the electro-motive force of the couple will obviously decrease thereby permitting the electro-motive force from the potentiometer to deflect the galvanometer contact arm 34 in a counter-clockwise direction against the contact 36, thus in the manner previously stated, causing the relays 37 and 50 to alternately energize and deenergize thereby causing the motor 1 to simultaneously move the potentiometer brush 6 and the contact arm 13 in a clockwise direction in proportion to the decreasing temperature of the furnace. The contact member 14 will obviously follow the contact arm 13 and be kept in contact therewith by the tension of the spring 12 until the arm 10 is intercepted by the fixed extension 15 after which the contact arm 13 will continue in a clockwise direction in proportion to the decreasing temperature of the furnace thus separating from the contact member 14. The first electrical impulse through relay 37 after 13 has separated from 14 will, in the manner previously stated, open the switch 102—103 to deenergize the relay 94 as illustrated in Figure 2 to again close the furnace switch 98—99. It follows therefore that when the temperature of the furnace is above the temperature determined by the position of the pointer 22, the relay 94 will be energized to open the furnace switch 98—99, and when the temperature of the furnace is below the temperature determined by the position of the pointer 22, the relay 94 will be deenergized to close the furnace switch 98—99. The above regulation is accomplished without sparking between 13 and 14 or between the galvanometer contact arm 34 and either the contact 35 or 31. This desirable condition is accomplished with respect to the galvanometer contact arm 34 and either of the contacts 35 or 36, first by the drop across the resistance 32 which in the manner previously stated forces said contact arm tightly against one or the other of said contacts and secondly due to the fact that the circuits which are thus closed by the galvanometer contact arm 34 will in the manner previously stated be opened by the switch 43—44 of relay 50. Similarly the circuit which initially energizes the relay 94 is closed by the switch 68—82 of relay 48, while the deenergizing of said relay 94 is caused in the manner previously stated by the opening of switch 102—103 of relay 37. The contact arm 13 and the contact member 14 therefore merely determine the temperature at which the relay 94 is energized or deenergized without either closing or opening a circuit at the time contact between said arm and member is initially established or broken.

I claim:

1. In a device of the class described, the combination with two electric contact members for controlling a condition, of means controlled by changes in the condition for changing the relative positions of said contact members, a second means controlled by changes in the condition for closing a switch, a circuit which includes the switch, the contact members and a relay, a second switch which is closed by the relay when energized, a second circuit which includes the second switch, the contact members and the relay, a third switch which is closed by the relay when energized, a third means controlled by changes in the condition for opening a fourth switch, and a third circuit which includes the third switch, the fourth switch and the relay.

2. In a device of the class described, the combination with two electric contact members, of electrical means controlled by increasing magnitudes of a condition for moving the first contact member toward the second contact member to establish electric contact between said members, electrical means controlled by decreasing magnitudes of the condition for moving the first contact member away from the second contact member to break electric contact between said members, a switch in series with said contact members, a relay which, when energized, closes the switch, a second means controlled by increasing magnitudes of the condition for energizing the relay, a second relay which controls the magnitude of the condition, a circuit through the second relay which includes said contact members and the switch, a second switch which is closed by the second relay when energized, a second circuit through the second relay which includes the second switch and the contact members, said second circuit being capable of energizing the second relay independently of the first circuit, a third switch which is opened by a third relay when energized, a second means controlled by decreasing magnitudes of the condition for energizing the third relay, a fourth switch which is closed by the second relay when energized, and a third circuit for energizing the second relay independently of the first and second circuits, said third circuit including the third and fourth switches in series.

3. In a device of the class described, the combination with a movable contact member mounted to revolve on a given axis, of a stop for limiting the clockwise motion of said contact member, a spring for forcing said member in a clockwise direction against the stop and against the tension of which spring said contact member is capable of moving in a counter-clockwise direction, a second movable contact member mounted to revolve on the same axis and which is intercepted by the first contact member as it moves in a counter-clockwise direction, electrical means for moving the second contact member in a counter-clockwise direction, a second electrical means for moving said second contact member in a clockwise direction, a third movable contact member, a fixed contact piece with which the third movable contact member makes electric contact when deflected in one direction, a second fixed contact piece with which the third movable contact member makes electric contact when deflected in the opposite direction, a relay for controlling the magnitude of a variable condition, a switch which is closed by a second relay when energized, a circuit for energizing the first relay said circuit including the first relay, the switch and the first and second movable contact members, a second circuit for energizing the second relay said circuit being closed by contact between the third movable contact member and the first fixed contact piece, a second switch which is closed by the first relay when energized, a third circuit which includes the second switch, the first relay and the first and second contact members, a third switch which is opened by a third relay when energized, a fourth circuit for energizing the third relay said circuit being closed by contact between the third movable contact member and the second fixed contact piece, a fourth switch which is closed by the first relay when energized, and a fifth circuit for energizing the first relay which includes the third switch, the fourth switch and the first relay in series.

4. The means set forth in claim 3 with the addition of means controlled by the variable condition for moving the third movable contact member with respect to the fixed contact pieces and independent means controlled by the first and second electrical means for moving said third movable contact member.

5. The means set forth in claim 3 with the addition of means controlled by the variable condition for moving the third movable contact member with respect to the fixed contact pieces, independent means controlled by the first and second electrical means for moving said third movable contact member, a fifth switch which is closed by a fourth relay when energized and opened thereby when deenergized said fifth switch being included in both the second and fourth circuits, and a sixth circuit which includes the fourth relay and a sixth and seventh switch in series, said sixth switch being closed by the second relay when energized and opened thereby when deenergized, and said seventh switch being closed by the third relay when energized and opened thereby when deenergized.

6. In a device of the class described, the combination with a switch which is opened by a relay when energized and closed thereby when deenergized, of a second switch which is opened by a second relay when energized and closed thereby when deenergized, a circuit which includes a third relay and the first and second switches in series, a third switch which is closed by the third relay when energized and opened thereby when deenergized, a fourth switch controlled by changes in a condition, a second circuit which includes the first relay, said second circuit being closed by the fourth switch to energize said first relay and opened by the third switch to deenergize said relay, a fifth switch controlled by changes in the condition, a third circuit which includes the second relay said third circuit being closed by the fifth switch to energize said second relay and opened by the third switch to deenergize said relay, a fourth relay, a fourth circuit which includes the fourth relay and a sixth switch which is normally open, said sixth switch being closed by the second relay when energized, a seventh switch which is closed by the fourth relay when energized, said seventh switch being included with the fourth relay in a fifth circuit, an eighth switch which is included in series with the fourth relay in both the fourth and fifth circuits, independent means for opening and closing the eighth switch, and a sixth circuit through the fourth relay said sixth circuit including a ninth and tenth switch, the ninth switch being closed by the fourth relay when energized, and opened thereby when deenergized and the tenth switch being opened by the first relay when energized and closed thereby when deenergized.

7. In a device of the class described, the combination with means responsive to changes in a condition, of a relay controlled by said responsive means, a switch which is opened by the relay when energized and closed thereby when deenergized, a second relay which is energized through said switch, a second switch which is closed by the second relay when energized and opened thereby when deenergized, said second switch being in series with the first relay to deenergize said relay when the second relay is deenergized, a movable contact element capable of making contact with a fixed contact element, means controlled by the first relay for changing the position of the movable contact element, means controlled by said contact element for changing the magnitude of the condition.

8. In a device of the class described, the combination with means responsive to changes in a condition, of a relay controlled by said responsive means, a second relay controlled by said responsive means, a switch which is closed by the first relay when deenergized and opened thereby when energized, a second switch which is closed by the second relay when deenergized and opened thereby when energized, a third relay in series with said switches and through which switches it is normally energized, a third switch which is closed by the third relay when energized and opened thereby when deenergized said third switch being included in both the first relay circuit and the second relay circuit, a movable contact member capable of establishing electric contact with a fixed contact member, means controlled by the first relay for moving the movable contact member toward the fixed contact member, means controlled by the second relay for moving the movable contact member away from the fixed contact member, and means controlled by said contact members for changing the magnitude of the condition.

9. In a device of the class described, the combination with a movable element the position of which is responsive to changes in a condition, a fixed contact member for limiting the motion of the movable element in one direction, a second fixed contact member for limiting the motion of the movable element in the opposite direction, a relay for closing a switch when energized and opening it when deenergized, a second relay, a circuit which includes the switch, the movable element, the first fixed contact member and the second relay, a third relay, a second circuit which includes the switch, the movable element, the second fixed contact member and third relay, a second switch which is closed by the second relay when deenergized and opened thereby when energized, a third switch which is closed by the third relay when deenergized and opened thereby when energized, a third circuit which includes the second and third switches in series with the first relay, a movable contact element, a normally fixed contact element with which said movable contact element is capable of making electric contact, means controlled by the second relay for moving the movable contact element toward the normally fixed contact element, means controlled by the third relay for moving the movable contact element away from the normally fixed contact element, a spring for forcing the normally fixed contact element against an adjustable stop and against the tension of which spring the movable contact element is capable of forcing the normally fixed contact element away from the adjustable stop, and means controlled by the relative position of the movable contact element with respect to the normally fixed contact element for changing the magnitude of the condition.

10. In a device of the class described, the combination with a movable member the position of which is responsive to changes in a condition, of a stop for limiting the motion of the movable member in one direction and with which the movable member is capable of making electric contact, a second stop for limiting the motion of the movable member in the opposite direction and with which the movable contact member is capable of making electric contact, means for changing the position of the movable member independently of changes in the condition, electrical means for actuating the independent changing means in one direction, a second electrical means for actuating the independent changing means in the opposite direction, a relay which when energized closes a switch and when deenergized opens said switch, a second relay, a circuit which includes the second relay, the switch, the movable member and the first stop, a third relay, a second circuit which includes the third relay, the switch, the movable member, and the second stop, a second switch which is opened by the second relay when energized and closed thereby when deenergized, a third switch which is opened by the third relay when energized and closed thereby when deenergized, a third circuit for normally energizing the first relay said circuit including the first relay and the second and third switches in series, a normally fixed contact element, a movable contact element which is capable of making electric contact with the fixed contact element and which is actuated to move toward the fixed contact element by the first electrical means and actuated to move away from the normally fixed contact element by the second electrical means, a fourth relay which controls the magnitude of the condition said relay being included in a fourth circuit in series with the movable contact element, the normally fixed contact element and a fourth switch said fourth switch being closed by the second relay when energized and opened thereby when deenergized, a fifth switch which is closed by the fourth relay when energized and opened thereby when deenergized, a fifth circuit which includes the fifth switch, the movable contact element, the normally fixed contact element and the fourth relay, a sixth switch which is opened by the third relay when energized and closed thereby when deenergized, a seventh switch which is closed by the fourth relay when energized and opened thereby when deenergized, a sixth circuit which includes the fourth relay and the sixth and seventh switches in series, an eighth switch which is opened by the second relay when energized and closed thereby when deenergized for controlling a seventh circuit through the first electrical means, and a ninth switch which is opened by the third relay when energized and closed thereby when deenergized for controlling an eighth circuit through the second electrical means.

11. In a device of the class described, the combination with a thermo-couple, of an adjustable potentiometer in a circuit with the couple for opposing the electro-motive force of the couple, a galvanometer in the circuit, a needle which is deflected clockwise by the galvanometer when the current through the circuit is in one direction and counter-clockwise when said current is in the opposite direction, a contact piece with which the needle makes electrical connection when deflected clockwise, a second contact piece with which the needle makes electrical connection when deflected counter-clockwise, electrical means for heating the couple, a switch for closing a second circuit through the electrical means said switch being closed by an electro-magnet when energized and open when said electro-magnet is deenergized, a second switch in a third circuit which includes the electro-magnet said second switch being closed by a second electro-magnet when energized and open when said magnet is deenergized, a fourth circuit which includes the second electro-magnet, the galvanometer needle, and the first contact piece, a third switch which is opened by a third electro-magnet when energized and closed when said magnet is deenergized, a fifth circuit which includes the third electro-magnet, the galvanometer needle, and the second contact piece, a fourth switch which is closed by the first electro-magnet when energized and open when said electro-magnet is deenergized, a sixth circuit which includes the first electro-magnet and the third and fourth switches in series, a fifth switch which is closed by the first electro-magnet when energized and open when said magnet is deenergized, said fifth switch being included with the first electro-magnet in a seventh circuit, a sixth switch included in both the fourth and fifth circuits said sixth switch being closed by a fourth electro-magnet when energized and open when said magnet is deenergized, an eighth circuit for energizing the fourth electro-magnet said eighth circuit including a seventh and an eighth switch in series, the seventh switch being opened by the second electro-magnet when energized and closed when said magnet is deenergized, and the eighth switch being opened by the third electro-magnet when energized and closed when said magnet is deenergized, a movable contact member and a normally fixed contact member with which the movable contact member is capable of making electric contact said contact members being included in the third and seventh circuits, a ninth circuit through an electrical means for moving the movable contact towards the fixed contact member and simultaneously adjusting the potentiometer in a given direction, said ninth circuit being controlled by a ninth switch which is opened by the second electro-magnet when energized and closed when said magnet is deenergized, a tenth circuit through an electrical means for moving the movable contact member away from the fixed contact member and simultaneously adjusting the potentiometer in the opposite direction, said tenth circuit being controlled by a tenth switch which is opened by the third electro-magnet when energized and closed when said magnet is deenergized, and manual means for adjusting the fixed position of the fixed contact member.

12. The means set forth in claim 11 with the addition of resilient means for holding the normally fixed contact member against an adjustable stop said resilient means consisting of a spring against the tension of which the movable contact member is capable of moving the normally fixed contact member when intercepted thereby, and a graduated scale and cooperating pointer associated with the adjustable stop for setting the stop in any desired position.

FRITZ FREDERICK UEHLING.